United States Patent [19]

Heuer et al.

[11] 4,369,877
[45] Jan. 25, 1983

[54] STOCKPILE RECLAIMING APPARATUS

[75] Inventors: Helmut Heuer, Bad Oeynhausen; Wilhelm Schäpsmeier, Porta Westfalica; Hans D. Fohlmeister, Bad Oeynhausen, all of Fed. Rep. of Germany

[73] Assignee: Weserhütte Aktiengesellschaft, Bad Oeynhausen, Fed. Rep. of Germany

[21] Appl. No.: 126,577

[22] Filed: Mar. 3, 1980

[30] Foreign Application Priority Data

Mar. 1, 1979 [DE] Fed. Rep. of Germany ....... 2907966

[51] Int. Cl.³ ............................................. B65G 65/06
[52] U.S. Cl. .................................... 198/509; 198/520
[58] Field of Search ............... 198/520, 509, 519, 713, 198/703; 414/133, 306; 37/391, 392

[56] References Cited

U.S. PATENT DOCUMENTS 740,560 10/1903 Hamilton ............................ 198/520
2,630,207 3/1953 Joy ..................................... 198/735
3,921,785 11/1975 Huitink ............................... 198/516
4,234,077 11/1980 Berthold et al. ..................... 198/713
4,248,337 2/1981 Zimmer ............................... 198/520

FOREIGN PATENT DOCUMENTS 896174 11/1953 Fed. Rep. of Germany ........ 37/391

Primary Examiner—Robet B. Reeves
Assistant Examiner—Brian Bond
Attorney, Agent, or Firm—Kenyon & Kenyon

[57] ABSTRACT

The invention consists of a stockpile reclaiming apparatus for discharging bulk material from a bed. The apparatus comprises a bridge which extends over the width of the stockpile, a support frame work, which is mounted from the bridge and a discharging means mounted on the frame work. The discharge means consists of an endless traction means and a series of discharge elements attached to the endless traction means. This endless path is disposed in a plane inclined to the bed of the stockpile whereby an acute angle is formed between this inclination and the plane of the bed.

6 Claims, 3 Drawing Figures

STOCKPILE RECLAIMING APPARATUS

This invention relates to a stockpile reclaiming apparatus. More particularly, this invention relates to a stockpile reclaiming apparatus for discharging bulk material from a stockpile.

As is known, various types of stockpile reclaiming apparatus have been used to clear away bulk material stacked in elongate or round stockpiles and to transfer the material to a suitable transport means, such as a belt conveyor lying externally of and parallel to the stockpile. Generally, it is known to clear the stockpiles from the long side, from the head or from the end face of the stockpile. The greatest homogenizing effect occurs where the bulk material is cleared from the end face of the stockpile.

Stockpile reclaiming devices which operate at the end face of a stockpile are generally displaceable in the direction of the axis of the stockpile and are generally comprised of a supporting construction which spans the entire width of the stockpile and is mounted on bogies to be movable along the stockpile as well as a discharging device mounted on the supporting construction. Furthermore, escarpment clearers, such as oscillating rakes, pivotable stripper ropes and the like can be included to sweep over the stockpile end face and loosen the bulk material so that the material trickles into the range of the discharging devices. In some cases, the discharging devices are constructed as rotating bucket tubes which extend over the entire width of the stockpile, of bucket wheels which are movable to-and-fro transversely of the axis of the stockpile and, in particular, of scraper elements which rotate parallel to the stockpile end face.

One known stockpile reclaiming device which is described in DE PS No. 21 55 355 has scraper equipment which is arranged centrally underneath a drivable bridge and which rotates in a plane lying perpendicularly to the base of the stockpile and parallel to the stockpile end face. When use of this equipment is envisaged at both sides, the scraper equipment must be constructed so that the bulk material can move from both sides into the range of action of the scrapers. Therefore, no lateral material guides can be provided which would prevent issuing of the bulk material on the side remote from the stockpile end face. In order to eliminate this factor, it is known, for example, from DE PS No. 26 16 807 to let the scraper equipment rotate in a plane parallel to the stockpile base and to arrange a material guide between both the scraper strands. Nevertheless, a danger exists even in this construction that the bulk material remains between the material guide and the stockpile bottom and becomes entrained by the return run of the scraper equipment lying at the same height as the working run and is subsequently dicharged to the opposite side.

This disadvantageous effect can also arise when the stockpile reclaiming apparatus tilts about an axis lying perpendicularly to the axis of the stockpile as a consequence of an uneven driving track.

Further, during the use of the heretofore known reclaiming apparatus, the bulk material scrapes on the bottom of the stockpile during the lateral discharge. This results in a greater or lesser grain comminution which, in many cases, is undesirable.

Accordingly, it is an object of the invention to provide a stockpile reclaiming apparatus wherein bulk material can be discharged from a stockpile with optimum grain preservation.

It is another object of the invention to avoid an undesired material conveying by the return run of the discharging device of a reclaiming apparatus.

It is another object of the invention to reduce to a minimum the issuance of bulk material out of the range of action of the discharging device.

Briefly, the invention provides a stockpile reclaiming apparatus for discharging bulk material from a stockpile having a predetermined bed. The apparatus is comprised of a bridge which extends over the width of the stockpile for displacement longitudinally of the stockpile, a support frame work mounted on and under the bridge and a discharging means which is mounted on the frame work. This discharging means includes an endless traction means or organ which is journalled in the frame work in parallel to an end face of the stockpile and a plurality of discharge elements which are fastened to the endless traction means for movement in an endless path parallel to and laterally across the width of the end face of the stockpile in order to discharge material at the base of the stockpile. In accordance with the invention, the endless path is disposed in a plane inclined to the bed of the stockpile. This plane further defines an acute angle with the plane of the bed with the apex of the angle directed toward the end face of the stockpile.

Since the discharge elements move through an inclined endless path, the return run of the discharging means lies higher than the working run. Hence, an undesired discharge of bulk material against the discharge elements can be avoided. Further, during discharge, the bulk material no longer scrapes on the bottom of the stockpile. Hence, not only is an undesired grain comminution avoided but also driving power is conserved because of the reduced friction.

Furthermore, an overall higher discharge performance can be obtained through the higher degree of filling of the discharge elements.

In accordance with the invention, the endless traction means is in the form of a link-to-strand chain while each discharge element includes a rear wall detachably connected with the chain, an angled bottom and a side wall. In the longitudinal run of the chain, the side wall of each discharging element forms a second side wall of an adjacent discharging element. In addition, where the chain has a plurality of hinge pins, each side wall of a discharge element is pivotally mounted on a hinge pin. In this way, upon stretching of the chain, each pair of adjacent bottoms prevent pivoting of a respective side wall therebetween.

The frame work may also be pivotally mounted on the bridge about an axis parallel to the end face of the stockpile. This allows the apparatus to be used between two stockpiles which lie behind each other. In this regard, the inclination of the plane of the endless conveyor can be set to correspond to the direction of reclaiming.

These and other objects and advantages of the invention will become more apparent from the following detailed description and appended claims taken in conjunction with the accompanying drawings in which:

FIG. 1 schematically illustrates a front elevational view of an apparatus in accordance with the invention without escarpment clearers;

FIG. 3 illustrates a perspective view of a series of discharge elements at the end of a run of the apparatus.

Figure 1:
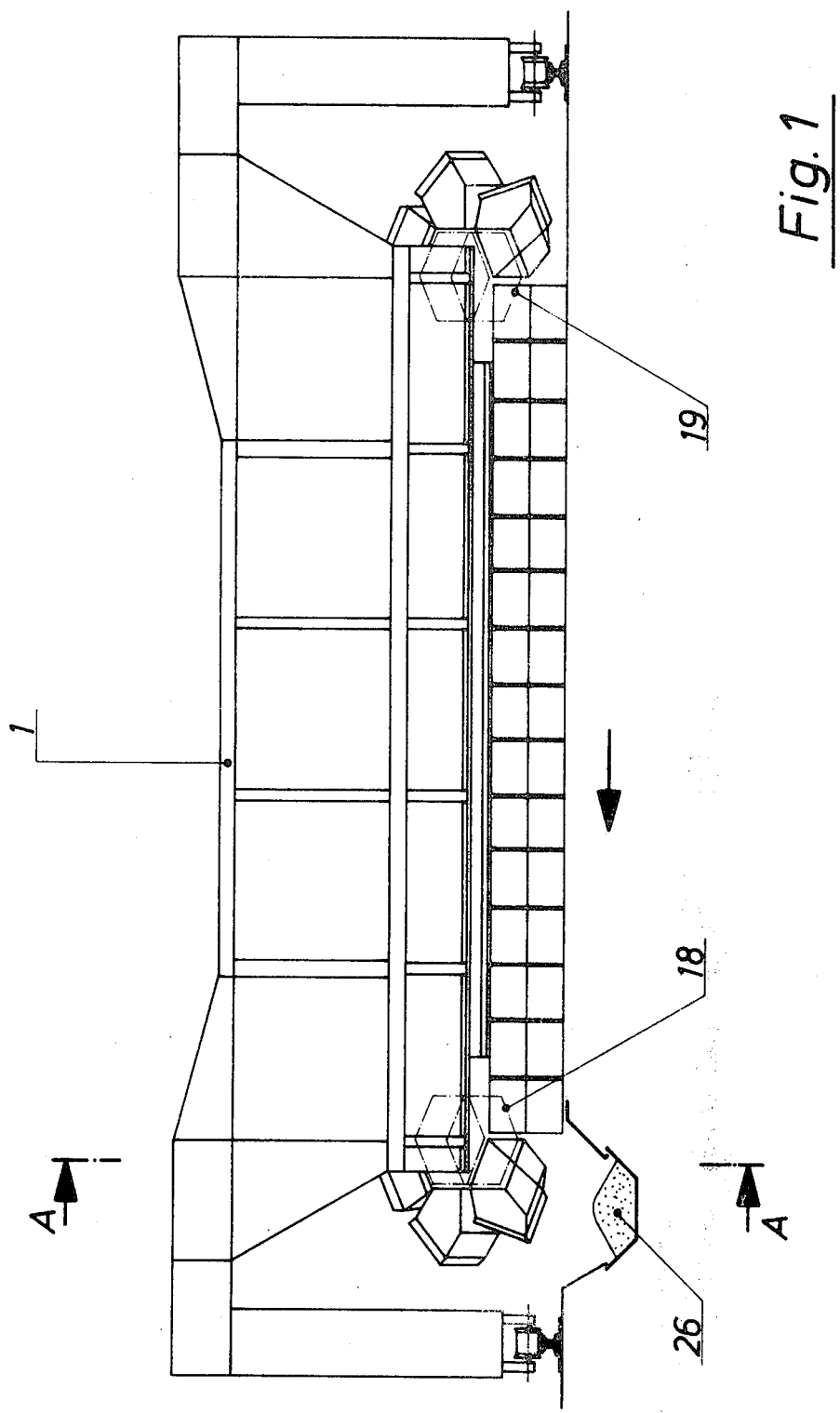
Figure 2:
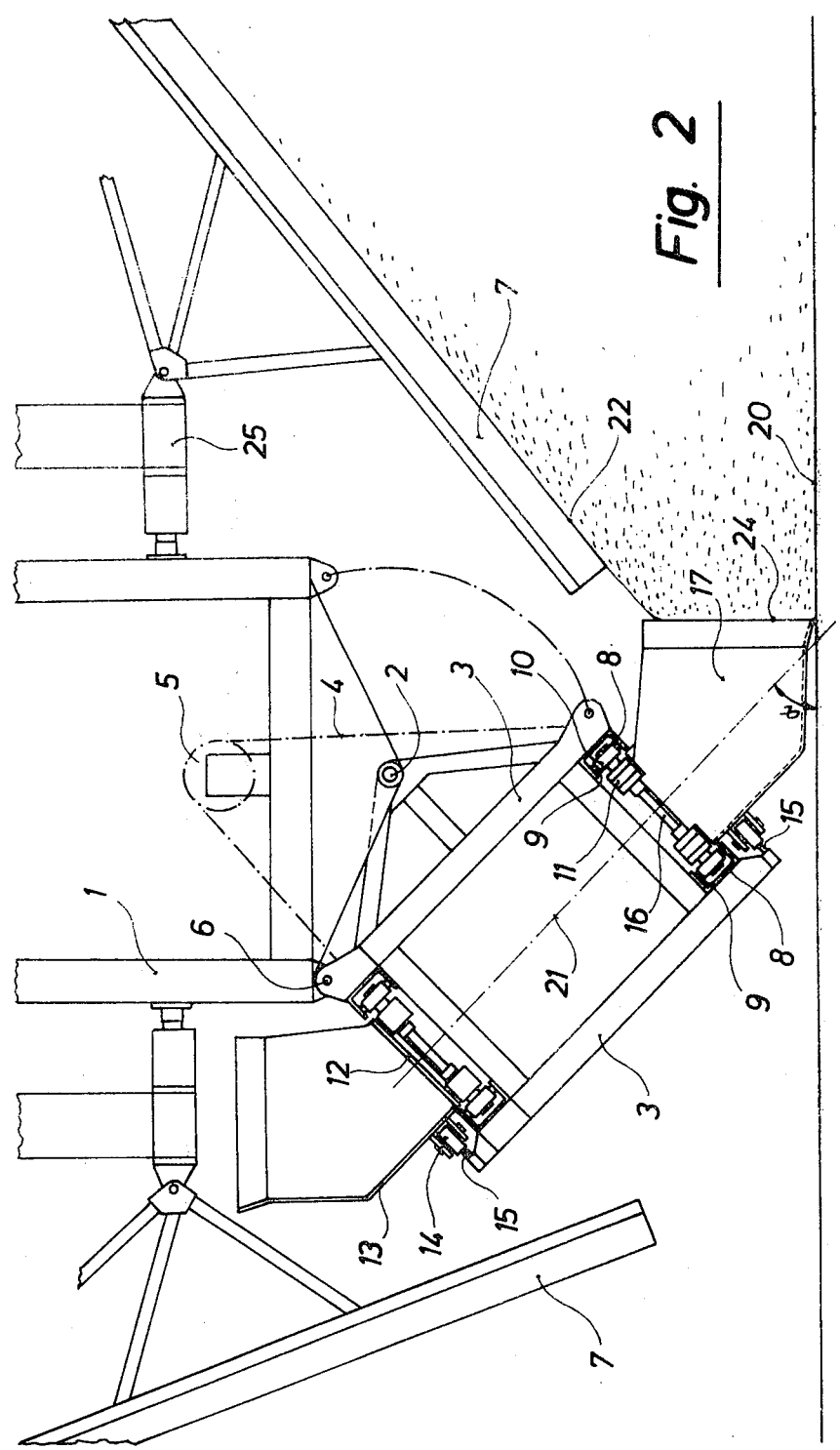
FIG. 2 illustrates a side elevational view taken on line A—A of FIG. 1.
Figure 9:
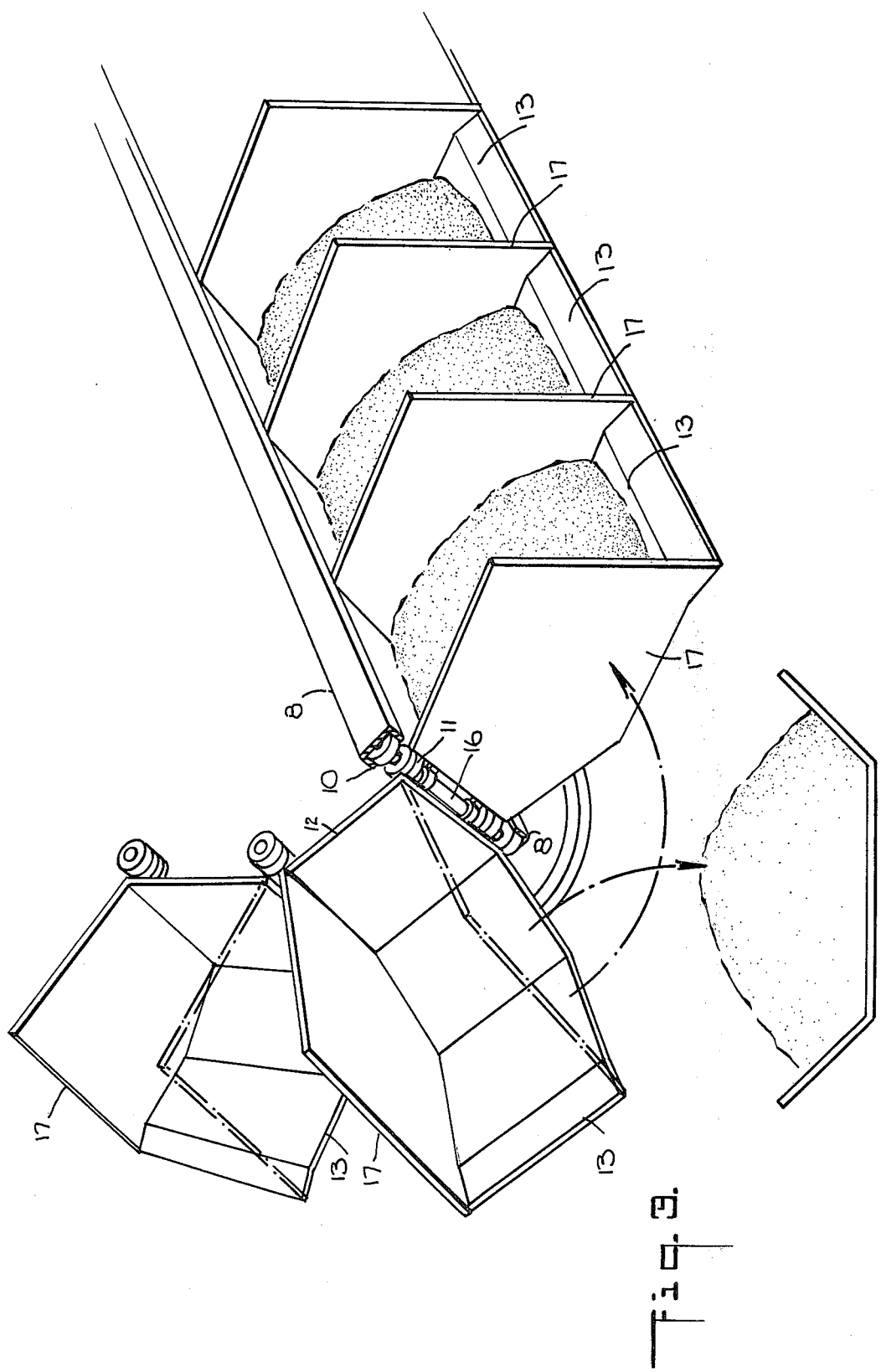

Referring to FIG. 2, the stockpile reclaiming apparatus includes a bridge 1 which extends over the width of a stockpile of bulk material. This bridge 1 is mounted on rail bogies (see FIG. 1) so as to be displaced longitudinally of and over the stockpile.

In addition, the apparatus includes a support frame work 3 which is mounted on and under the bridge 1. As indicated in FIG. 2, the supporting frame work 3 is pivotable about an axis 2 which is parallel to the end face of the stockpile. A suitable chain 4 which can be driven by a drive 5 on the bridge is provided for pivoting the frame work 3. Also, a suitable locking device 6 is provided to lock the frame work 3 to the bridge 1 for relief of the link chain 4 during operation.

As shown in FIG. 2, the frame work 3 has a discharging means mounted thereon. This discharging means includes an endless traction means which is journalled in the frame work 3 in parallel to an end face of the stockpile and a plurality of discharge elements which are fastened to the endless traction means. As shown, the endless traction means is in the form of a two-strand chain 11. The chain 11 has a plurality of outer runners 10 which are guided between parallel guide tracks 9 disposed on two mutually parallel guide carriers 8. As indicated, the pairs of guide carriers 8 are arranged on both sides of the supporting frame work 3 in parallel to the longitudinal axis thereof. Alternatively, in place of the runners 10, skids (not shown) may also be provided.

Each discharge element includes a rear wall 12 which is detachably connected with the chain 11, and angled or bent bottom 13 and a side wall 17. Each discharge element also carries a roller 14 which is mounted on a bottom 13 so as to support the discharge element on a guide rail 15 connected to the supporting frame work 3. Each side wall 17 is also mounted on one of a plurality of hinge pins 16 of the chain 11 so as to be pivotable about the axis of the hinge pin 16. Each side wall 17 also extends downwardly to such an extent that, in the extended or stretched position of the chain 11, the side edges of the bottoms 13 of two adjacent discharge elements prevent pivoting of the side wall 17 therebetween.

Each side wall 17 is also provided with a cutting edge 24 which can be plumb, inclined forwardly or rearwardly.

Referring to FIG. 1, the endless chain 11 loops over a driving tumbler 18 with an associated drive (not shown) and a tensioning tumbler 19. These tumblers 18, 19 are arranged at the end faces of the supporting frame work 3 as schematically illustrated.

Referring to FIG. 2, the apparatus is also provided with suitable escarpment clearers 7 which are each articulated to a frame work 25 which is displaceable on the bridge 1 in the longitudinal direction thereof.

As shown in FIG. 2, the discharge elements are mounted for movement in an endless path parallel to and laterally across the width of the end face of the stockpile in order to pick up bulk material directly therefrom. Further, the endless path is disposed in a plane 21 which is inclined to the bed 20 of the stockpile. Further, this plane 21 of rotation defines an acute angle with the plane 20 of the bed with an apex of the angle directed toward the end face of the stockpile.

As shown in FIG. 1, a transport means in the form of a conveyor 26 is disposed at the discharge end of the discharge means for sequentially receiving bulk material from the end of the discharge elements.

During operation, the two-strand chain 11 is stretched. In this condition of the chain 11, the discharging elements in the working run of the conveyor are open for material take-up only upwardly and towards the end face 22 of the stockpile. As shown in FIG. 3, as the discharge elements deflect at the tumbler 18, wedge-shaped gaps form between the bottoms 13 of adjacent discharge elements. Further, as a consequence of the inclined plane of rotation 21, the bulk material disposed in the discharging elements slides out and is transferred to the conveyor 26. In this regard, the pivotal side wall 17 of each discharge element remains in bearing contact against the side edge of a bottom 13 of the following discharge element as viewed in the conveying direction. Further, during travel through a returning run of the conveyor, the discharge elements are empty.

With a stockpile reclaiming apparatus operating only one sidedly, the support frame work 3 can be rigidly connected with the bridge 1. Hence, the pivot axis 2, link chain 5, drive 5 and locking device 6 are no longer needed. Furthermore, the side walls 17 of the discharge element need not be pivotally connected with the hinge pins 16. Instead, each side wall 17 may be rigidly connected with the side edges so as to lie forwardly in the conveying direction of the rear walls 12 and bottoms 13.

It is to be noted that the reclaiming apparatus may be suitable for use in removing bulk material which has been stacked in long or round stockpiles.

What is claimed is:

1. A stockpile reclaiming apparatus for discharging bulk material from a stockpile having a predetermined bed; said apparatus comprising
   a bridge extending over the width of the stockpile for displacement longitudinally of the stockpile;
   a support framework mounted on and under said bridge; and
   a discharging means mounted on said framework, said means including an endless traction means journalled in said framework in parallel to an end face of the stockpile and a plurality of discharge elements fastened to said endless traction means for movement in an endless path parallel to and laterally across the width of the end face of the stockpile to pick up material directly therefrom and to discharge the material at the base of the stockpile, each said discharge element including a rear wall, a bottom and a pivotal side wall, each said side wall abutting a bottom of a following discharge element wherein in a longitudinal run of said traction means, said side wall of one discharging element forms a second side wall of an adjacent discharging element, said endless path being disposed in a plane inclined to the bed of the stockpile, said plane defining an acute angle with the plane of the bed with an apex of said angle directed toward the end face of the stockpile.

2. A stockpile reclaiming apparatus as set forth in claim 1 wherein said traction means is a linked two-strand chain having a plurality of hinge pins therein, each said rear wall is detachably connected with said chain and each side wall of a respective discharge element is pivotally mounted on a respective hinge pin whereby in said longitudinal run of said chain, each pair of adjacent bottoms prevent pivoting of a respective side wall therebetween.

3. A stockpile reclaiming apparatus for discharging bulk material from a stockpile having a predetermined bed; said apparatus comprising a bridge extending over the width of the stockpile for displacement longitudinally of the stockpile;

a support framework mounted on and under said bridge; and a discharging means mounted on said framework, said means including an endless linked two-strand chain journalled in said framework in parallel to an end face of the stockpile and a plurality of discharge elements fastened to said chain for movement in an endless path parallel to and laterally across the width of the end face of the stockpile to pick up material therefrom and to discharge the material at the base of the stockpile, each discharge element including a rear wall detachably connected with said chain, an angled bottom and a side wall wherein in a longitudinal run of said chain, said side wall of one discharging element forms a second side wall of an adjacent discharging element, said endless path being disposed in a plane inclined to the bed of the stockpile, said plane defining an acute angle with the plane of the bed with an apex of said angle directed toward the end face of the stockpile.

4. A stockpile reclaiming apparatus for discharging bulk material from a stockpile having a predetermined bed; said apparatus comprising a bridge extending over the width of the stockpile for displacement longitudinally of the stockpile;

a support framework pivotally mounted on and under said bridge about an axis parallel to the end face of the stockpile; and a discharging means mounted on said framework, said means including an endless traction means journalled in said framework in parallel to an end face of the stockpile and a plurality of discharge elements fastened to said endless traction means for movement in an endless path parallel to and laterally across the width of the end face of the stockpile to pick up material therefrom and to discharge the material at the base of the stockpile, said endless path being disposed in a plane inclined to the bed of the stockpile, said plane defining an acute angle with the plane of the bed with an apex of said angle directed toward the end face of the stockpile.

5. A stockpile reclaiming apparatus as set forth in claim 4 wherein each discharge element includes a rear wall, a bottom and a side wall secured to said rear wall and said bottom.

6. A stockpile reclaiming apparatus as set forth in claim 4 wherein each discharge element includes a side wall pivotally connected to said endless traction means.

* * * * *